United States Patent [19]

Williams

[11] 4,027,928

[45] June 7, 1977

[54] COOLING AND LUBRICATION ARRANGEMENT FOR WATER COOLED BEARINGS HAVING SELF CONTAINED LUBRICATION SYSTEMS

[75] Inventor: John G. Williams, Warren, N.J.

[73] Assignee: Turbodyne Corporation (Steam Turbine Div.), Wellsville, N.Y.

[22] Filed: June 1, 1976

[21] Appl. No.: 691,232

[52] U.S. Cl. .................................. 308/77; 308/127
[51] Int. Cl.² .......................................... F16C 1/24
[58] Field of Search ....................... 308/76, 77, 127; 184/104; 417/367

[56] References Cited

UNITED STATES PATENTS

| | | | |
|---|---|---|---|
| 1,942,101 | 1/1934 | Howarth | 308/76 |
| 2,249,021 | 7/1941 | McHugh | 308/76 X |
| 3,532,443 | 10/1970 | Johnson | 308/76 X |
| 3,806,210 | 4/1974 | Deleu | 308/127 |

Primary Examiner—Joseph F. Peters, Jr.
Assistant Examiner—Gene A. Church
Attorney, Agent, or Firm—Daniel H. Bobis

[57] ABSTRACT

A cooling and lubrication arrangement for a bearing supporting a rotatable shaft wherein the bearing housing includes, a self contained lubrication system for the bearing, and an operatively associated improved cooling fluid flow chamber therein. The bearing housing has supporting structure to minimize conductive heat flow to the bearing and the improved cooling fluid flow chamber has one relatively thin supporting wall adjacent the bearing and is provided with an internal geometry which forms a zone of high velocity cooling fluid closely adjacent the said thin supporting wall to achieve a high heat transfer rate from the bearing to the cooling fluid flowing through the improved cooling fluid flow chamber. A conventional open or closed type cooling fluid circulating system is connected to the bearing housing for delivering cooling fluid to and removing the same from the cooling fluid flow chamber and such fluid circulating system may desirably include an auxiliary circulating device for use on hot standby condition or after shut down of the apparatus or equipment such as a turbine with which the bearing is operatively associated.

Additionally the cooling and lubrication arrangement having the improved fluid cooling chamber as above described wherein the self contained lubrication system for the bearing includes, a sump in the bearing housing adjacent at least a portion of the common wall with the fluid cooling chamber, at least one oil slinger ring mounted about and rotatable with the shaft and disposed in that portion of said sump adjacent the common wall of the fluid cooling chamber so that cooled lubricant from the lubricant sump will be delivered to the bearing on rotation of said shaft, and a return passage on the inboard side of said bearing extending through said relatively thin wall of the bearing housing to cool lubricant returning therethrough to the sump.

25 Claims, 9 Drawing Figures

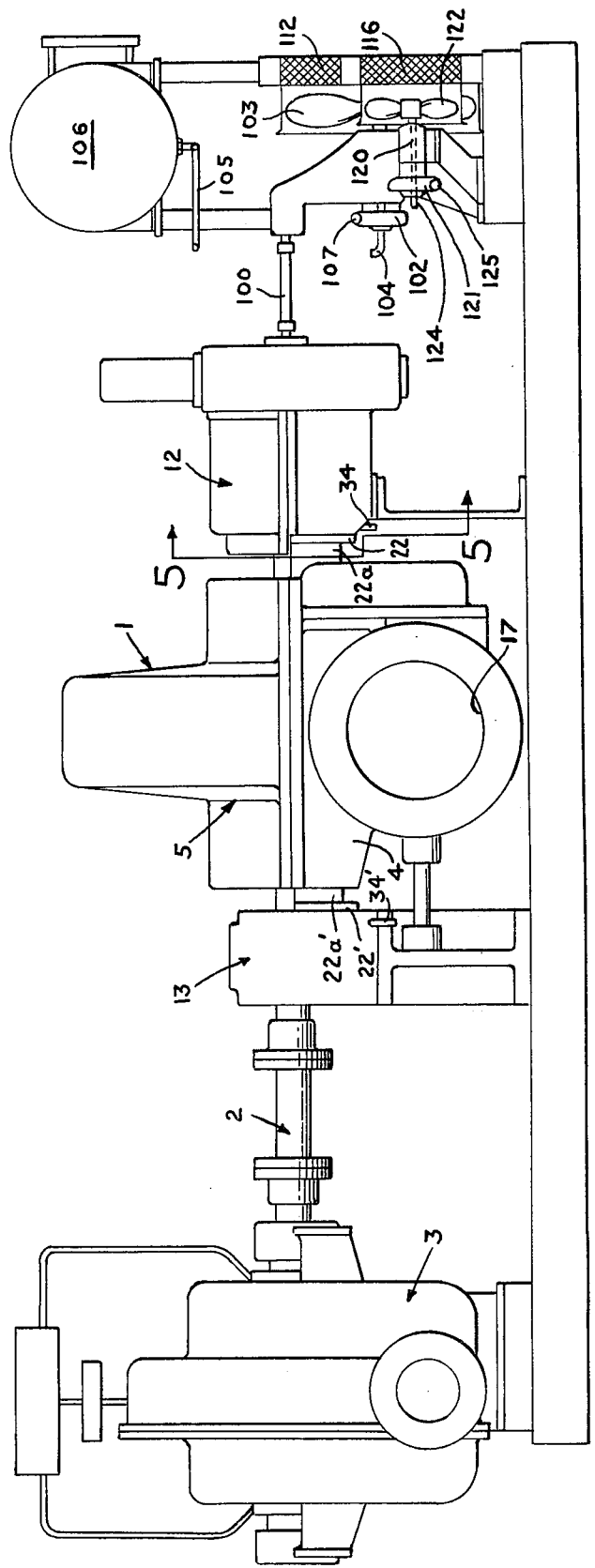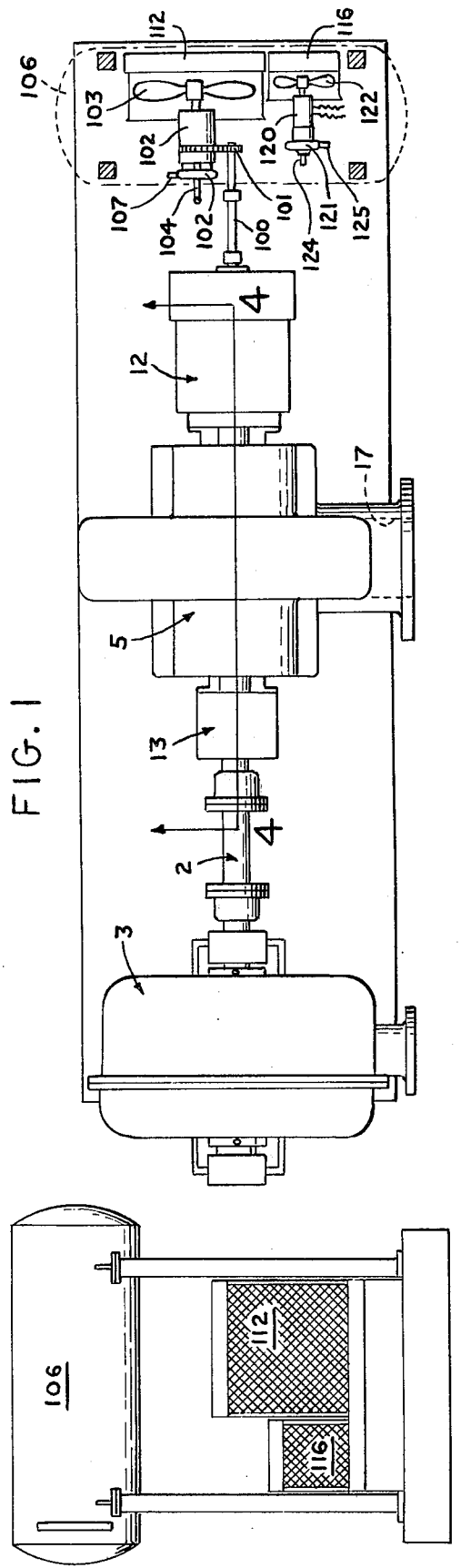
FIG. 1
FIG. 2
FIG. 3

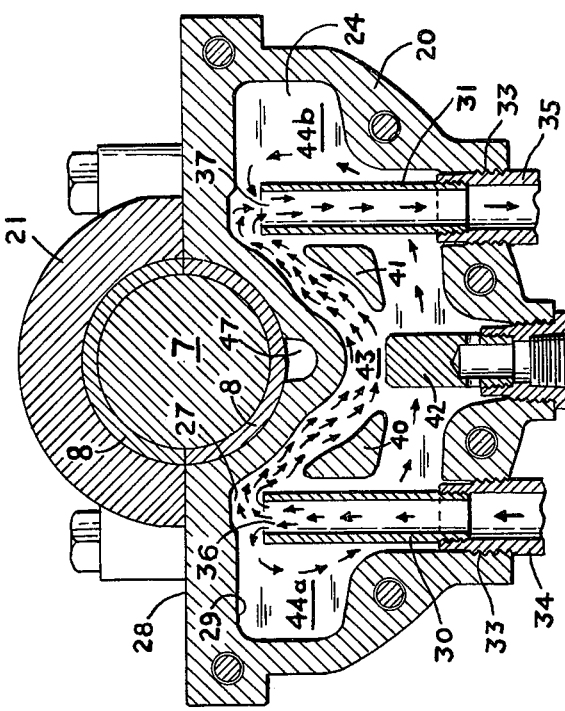
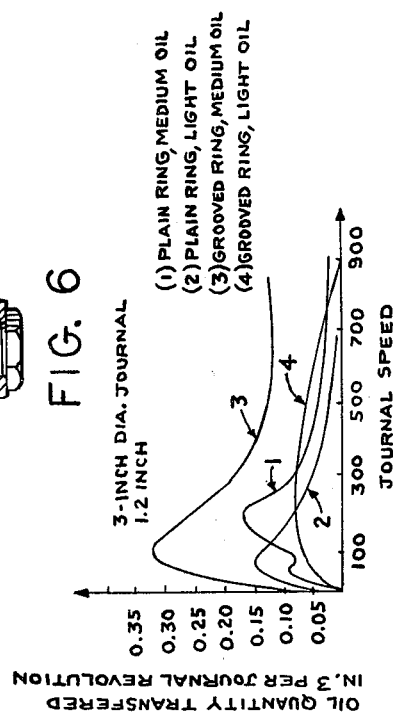
FIG. 6
FIG. 8
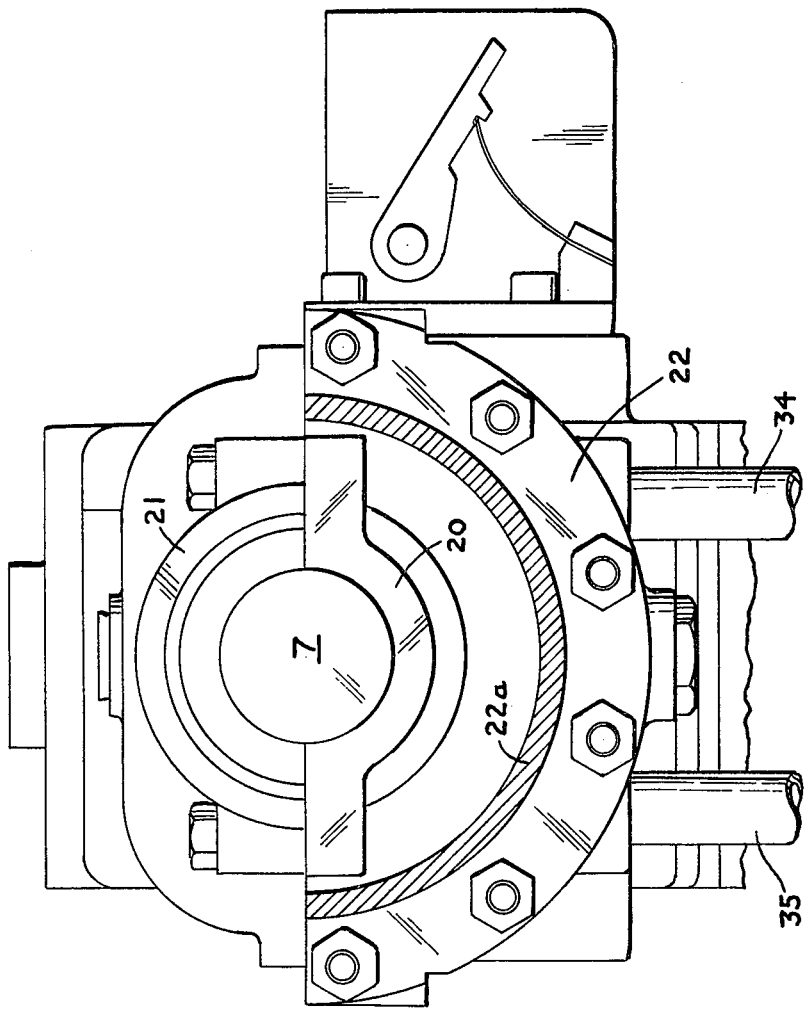
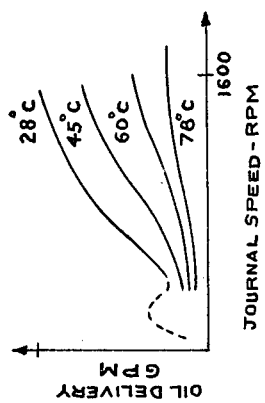
FIG. 5
FIG. 7

COOLING AND LUBRICATION ARRANGEMENT FOR WATER COOLED BEARINGS HAVING SELF CONTAINED LUBRICATION SYSTEMS

BACKGROUND OF THE INVENTION

This invention relates generally to fluid cooled bearings for rotating members, and more particularly to an improved fluid cooling chamber in the bearing housing for such bearings wherein the bearings preferably have self contained lubrication systems and to an improved closed type circulating system operatively associated with the improved fluid cooling chamber all operative for maintaining the bearing below a predetermined maximum temperature.

The use of a chamber for cooling fluid to maintain bearings and/or the lubricant used with such bearings from exceeding a predetermined maximum temperature is known to the prior art as is shown in U.S. Pat. Nos. 3,806,210; 2,098,683; 2,344,240; 2,249,021 and 2,238,925.

The present invention is particularly applicable to water cooled journal bearings for single-stage steam turbines which are supplied lubricant by self contained lubrication systems having at least one oil slinger ring rotated by the turbine shafts which are rotatably mounted in such water cooled journal bearings.

These water cooled journal bearings are generally mounted in bearing housings and for reasons of proper alignment and concentricity of the rotating and stationary parts of the steam turbine, the bearing housings are solidly connected or affixed to the steam turbines in any suitable manner as will be clear to those skilled in the art.

The bearing housings for such water cooled bearings include the oil sump for the self-contained lubricating systems through which at least one oil slinger ring is rotated on rotation of the shaft to deliver oil from the sump to the journal bearing, and an integral cooling system which includes, a cooling fluid flow chamber having a common wall with the oil sump and through which cooling water from any suitable source such as river water, cooling pond water etc. is passed and returned so that the common wall serves as an elementary heat exchanger in the bearing housing.

In general, fluid cooling systems for such water cooled journal bearings are designed to achieve maximum heat transfer rates across such common wall with the oil sump for the self contained lubrication system because this will result in a relatively lower bearing temperature. Lower bearing temperatures allow for the selection of less costly bearing materials and promote maximum bearing life because optimum oil film thickness can be maintained between the journal bearings and the shafts rotatably journaled therein at such lower temperatures as will be more fully explained below.

In the selection of less costly bearing materials it is recognized by those skilled in the art that the use of babbitt lined bearing shells are both technically and economically desirable. However, inherent with babbitt lined bearing shells is that deformation thereof cannot be avoided where the bearing temperatures exceed 250° F. Therefore in all fluid cooled babbitt type bearings, the bearing temperatures for all operating conditions must be maintained below this critical limit.

In order to understand the factors which influence the bearing temperature of water cooled bearings having self contained lubrication systems, it is essential to recognize the actual sources of heat flow to or from the journal bearings and the basic principles of heat transfer involved which affect such heat flow.

Additionally, the effect that increased temperature has on the pumping capacity of the oil slinger rings in the self contained lubrication system for the journal bearing must also be taken into account as is more fully set forth below.

Thus heat at the journal bearing comes from three sources. First, by conductivity from the hot turbine casing to the bearing housing, second by conductivity along the shaft from the hot temperature region in the turbine to the journal bearing, and third due to viscous shear of the oil film which separates the journal bearing from the shaft when the turbine shaft is rotating.

Treating first with the equation which relates the variables in respect of heat transfer or heat flow due to conductivity, reference may be had to any well known heat transfer texts such as Introduction to Heat Transfer by Brown and Marco, 3rd. edition where such equation is generally set forth as follows:

1. $Q = K \times \Delta T \times A/L$ where
$Q$ = Heat flow rate — BTU/hour
$K$ = Conductivity coefficient — BTU/hr/in$^2$/° F
$\Delta T$ = Temperature Difference — ° F
$A$ = Average Section areas — inch$^2$
$L$ = Length applicable to $\Delta T$ — inches In this equation, if we assume iron or steel is used in the turbine casing and bearing housing, then K and $\Delta T$ will be fixed by economic or service conditions and it is only possible to influence Q by a judicious selection of the ratio of A the average section area to L, the length applicable to $\Delta T$.

Thus, this equation teaches that minimum heat flow from the turbine casing to the bearing housing can be achieved by minimizing the contacting area and the cross sectional area of the joint between the operatively associated supporting structure of the turbine casing and the bearing housing and by making the length, distance or spacing between the turbine casing and bearing housing as large as technical and economic considerations will permit.

Conversely for maximum heat transfer from the journal bearing shell, the metal wall of the journal bearing supporting the bearing shell and disposed between the bearing shell and the fluid cooling chamber in the bearing housing should have as large an area as possible while the thickness of this metal wall should be minimized so that this wall can be as thin as good foundry practice will permit.

In the prior art devices analysis shows that the cross-sectional area of the structure rigidly connecting the turbine casing and the journal bearing housing is quite large and the distance between the turbine casing and the journal bearing casing relatively short. This construction in accordance with the above equation produces large conductive heat flow rates from the turbine casing to the interior of the bearing housing where the bearing shell is located.

Additionally, in the prior art devices, the thickness of the metal of the journal bearing shell to the cooling water chamber is relatively large or longer than necessary and the area of this support structure is frequently quite small.

Thus, the connecting structure for the bearing housing and the bearing housing design of the prior art devices have not been planned either to minimize conductive heat flow to the bearing or to maximize conductive heat flow from the bearing to the cooling fluid in the fluid cooling chamber in the bearing housing. Consequently, in such prior art bearing housing designs, heat removal from the bearing is largely dependent upon the quantity and temperature of the oil supplied to the bearing by the slinger rings which rotate with the shaft.

It has been proven through tests by various investigators that the quantity of oil delivered by oil slinger rings is highly dependent upon the viscosity of the oil in the sump. As the viscosity decreases, oil delivery by the rotating ring drops very quickly. Since the rate of heat generation due to viscous shear rises rapidly with speed on journal bearings, higher oil temperatures which cause a reduction in oil viscosity will occur at a time when the oil delivery rate from the slinger ring declines sharply. Bearing failure will occur when the quantity and viscosity of oil supplied are insufficient to maintain an adequate oil film thickness between the journal and bearing.

Therefore, with such prior art bearings, the operating limitations of the slinger rings will usually determine the maximum operating speed and temperature limit for the turbine.

The complex, inter-dependent relationship of oil slinger ring pumping capacity to shaft speed and to conducted temperature from the turbine casing is the current principal limitation to extended usage of the low cost, oil slinger ring lubrication system.

In prior art bearing housings, a relatively large cooling water chamber is commonly located below and adjacent to the oil sump, the intended purpose being to cool the oil therein as much as possible by providing a common separating wall of relatively large area. This would appear logical in view of the dependence of prior art bearings upon oil slinger ring pump capacity as explained above.

However, an analysis of such constructions, following modern heat transfer laws for forced convection will prove that this elementary heat exchanger is very inefficient, primarily due to the poor heat conductivity of oil and the low through flow velocities of both the oil in the sump and the cooling water through the fluid cooling chamber in the bearing housing.

Collateral to heat flow due to conductivity those, skilled in the art will recognize that during operation, there will develop a thin but stagnant film of water or other cooling fluid which adheres to the interior surface of the cooling fluid chamber. This film adversely affects the heat transfer rate from the bearing shell and the wall supporting the bearing shell to the cooling water passing through the cooling fluid chamber in the bearing housing or from the common wall between the sump and the fluid cooling chamber to the cooling fluid passing through the fluid cooling housing.

The existence of the thin but stagnant film of water on the interior surface of the fluid cooling chamber in the bearing housing is described in considerable detail in most modern texts on heat transfer.

The equation which relates the variables affecting the forced convection heat transfer across the film to maintain minimum temperature difference between the cooling water and the adjacent metal wall can be generally derived from the Brown and Marco Text above cited at Page 133 as follows:

$$h_c = 0.023 \frac{K}{D} \left(\frac{DV\rho}{u}\right)^{0.8} \left(\frac{C_p V}{K}\right)^{0.4} \qquad 1.$$

where
$h_c$ = film, heat transfer coefficient — BTU/hr/ft$^2$/° F
$K$ = thermal conductivity of Water BTU/hr/ft/° F/ft
$D$ = equivalent hydraulic diameter — ft
$V$ = water velocity ft/hr
$\rho$ = water density lb/ft$^3$
$u$ = water absolute viscosity — lb/ft/hr
$C_p$ = water specific heat — BTU/lb/° F Since water is the usual coolant in such water cooled journal bearings, the only variables which can be adjusted are V, the water velocity and D the equivalent hydraulic diameter and thus this equation can be reduced to the following:

$$h_c \sim V^{0.8}/D^{0.2} \qquad 2.$$

Thus, if V the water velocity is large and D the equivalent hydraulic diameter is small, a high heat transfer rate will be achieved because the thickness of the stagnant film on the interior surface of the cooling fluid chamber will be small.

By applying the above principles of conductive heat flow and force convection heat transfer to the present invention the bearing and the oil temperatures have been so significantly reduced as to permit turbines utilizing improved water cooled bearings with self contained lubrication systems of the oil slinger ring type in accordance with the present invention to be operated at higher shaft speeds. The advantage of such higher shaft speeds is to generally improve turbine efficiency and these higher shaft speeds become possible from a design which provides improved pumping capacity of the oil slinger ring in the self contained lubrication system.

Broadly, therefore the principle characteristics of the improved water cooled bearing with a self-contained lubrication system in accordance with the present invention will have at least the following major features.
1. Support structure designed to minimize heat flow from the hot turbine casing.
2. A cooling fluid chamber which, by reason of its location, geometry, and interior design, achieves improved direct cooling of the bearing shell so as to minimize dependence upon the cooling effect of oil supplied to the bearing by the slinger ring, achieves improved direct cooling of the oil to be pumped from the adjacent oil sump, and additionally intercepts heat flowing from the turbine casing to the oil sump, and
3. passage means which form a flow path for returning oil, the result of which is that a large part of the oil supplied to the bearing will be cooled while in the bearing and while returning from the bearing.

Further, water cooled bearing housings of the prior art type and those in accordance with the present invention are usually horizontally split. To simplify inspection or replacement of the bearing shell, the cooling jacket or chamber with connections thereto is invariably located in the lower or bottom half of the bearing housing.

As will be understood by those skilled in the art, it is desirable to maintain the entire upper and lower housing in which the bearing shell is journalled, and which therefore surrounds the bearing shell, as close to an isothermal condition as possible. However, with horizontally split bearing housings, some portions of the upper half of the housing cannot be in immediate proximity to the cooling fluid chamber in the lower half of the bearing housing. Large temperature differences are avoided in the cooling and lubricating arrangement in accordance with the present invention by making thick walled sections on that part of upper half of the bearing housing which is furthest removed from the cooling fluid chamber in the lower half of the bearing housing. This construction being dictated by the same principles defined in the conductivity equation above. Thus, where physical necessity requires a longer length, the section area must be increased to maintain the minimal metal temperature about the upper half of the bearing shell.

It is also essential to note that journal bearings having self-contained lubrication systems which are associated with steam turbines may be subjected to excessive bearing temperatures when the turbine is brought to a stop. This occurs when the turbine is brought to a stop first because delivery of the cool oil supply to the bearing ceases and second due to the fact that it may require as much as an hour or more to dissipate the high temperature heat stored in the turbine casing and rotor. In effect therefore, when an operating steam turbine is brought to a stop the first and second sources of heat flow as above outlined will continue.

In prior art bearing housings heat removal by direct conductance from the bearing shell to the cooling water chamber is relatively small. As a consequence of this, maximum permissable bearing temperature are largely dependent upon the quantity and temperature of the oil delivered by the oil slinger ring which rotates with the shaft. Therefore, at idling speeds or when the turbine is brought to a stop, bearing temperatures can and have become excessive, particularly where the steam temperatures at which the steam turbine operates is high.

Accordingly, to prevent the bearing temperature from becoming excessive after a steam turbine is brought to a stop, a reliable bearing system for such steam turbine must not only be designed for adequate heat removal capacity during normal operating conditions but additionally for dissipation of the "heat soak" effect which occurs after a hot turbine is brought to a stop.

This is accomplished in the present invention by achieving large heat removal capacity by direct conduction from the bearing shell to the cooling fluid chamber which is independent of turbine shaft speeds. Therefore, excessive bearing temperatures above 250° F are avoided even when the shaft is stationary.

In the bearing in accordance with the present invention, when the shaft is rotating, additional cooling is obtained from the cool oil supplied by the oil slinger ring. Therefore, even at maximum shaft speeds, the bearing temperature will not exceed the usually specified limit of 180° F.

The overall heat exchange rate of the bearing housing design of the present invention is much greater than that of comparable prior art bearing housings both when the turbine is running and when it is stopped. Therefore this bearing in accordance with the present invention not only meets and solves the problems regarding excessive bearing temperatures when the turbine is idling or brought to a stop but further permits accomodation of the turbine not only to the open cooling fluid circulating system with which comparable prior art devices have operated as is well known and understood by those skilled in the art but additionally to cooling fluid circulating systems of the closed type which are now in growing demand.

The conventional open system is one where water is piped to the turbine bearing housing from a lake or river and the heated effluent water is piped away to a sewer system. In a closed system, the coolant is circulated from a reservoir to and through the bearing housings and then the heated effluent coolant is passed to a heat exchanger, the cooled effluent coolant then being returned to the reservoir for recirculation to the bearing. Such closed systems utilizing a fan and radiator type heat exchanger are commonly found on automobile engines and on portable compressors.

For many applications a closed cooling fluid circulating system would be desirable for at least the following reasons:
1. It could avoid ecological restrictions due to Federal, State or Local ordinances.
2. It would avoid the maintenance complications and installation costs where protection from freezing weather would be required with open systems, in that closed systems generally utilize a mixture of water and ethylene glycol as the coolant, and
3. It would avoid restriction on operation when a draught occurs.

Water Cooled Bearings in accordance with the prior art have never been successfully applied to closed fluid cooling systems except in isolated instances where both the inlet steam temperature and operating speeds of the turbine were low.

However, bearings in accordance with the present invention can be applied satisfactorily to either open or closed systems for steam inlet temperatures to 750° F and speeds to at least 5000 RPM.

In the cooling fluid circulating system of the closed type which is hereinafter illustrated for use with the improved cooling and lubrication arrangement for bearings in accordance with the present invention, there is further illustrated a "totally closed system concept" i.e. one in which the bearings of an auxiliary device can also be cooled by the same closed type fluid cooling system associated and used with the improved cooling and lubrication arrangement for bearings in accordance with the present invention.

SUMMARY OF THE INVENTION

Thus the present invention covers a cooling and lubrication arrangement for maintaining the temperature of a bearing supporting a rotatable shaft below a predetermined maximum temperature wherein the bearing housing for the bearing includes, a self contained lubrication system for the bearing and an improved cooling fluid flow chamber disposed for operative association with the bearing and the self contained lubrication system, said bearing housing having a connecting means to minimize heat flow to the bearing and a relatively thin supporting wall for the bearing, internal flow directing geometry in the cooling fluid flow chamber of said bearing housing disposed to provide a zone of high velocity cooling fluid flow closely adjacent to the relatively thin supporting wall for the bearing to promote a high heat transfer rate from the bearing to the cooling fluid passing through the cooling fluid flow chamber, and means connected to said bearing housing for delivering and removing cooling fluid from the improved cooling fluid flow chamber.

Additionally the present invention covers a cooling and lubrication means for a bearing as above described wherein the means for delivering and removing cooling fluid from the improved cooling fluid flow chamber constitutes a closed type circulating system and said closed type circulating system has an auxiliary means for delivery cooling fluid to and returning the same from the improved cooling fluid flow chamber after the associated device to which the bearing housing is connected is brought to a stop.

Additionally the present invention covers a cooling and lubrication arrangement for a bearing supporting a rotatable member wherein the bearing housing for the journal bearing has a connecting means to minimize heat flow to the bearing and a relatively thin supporting wall for the bearing, and defined in the bearing housing is an improved cooling fluid flow chamber having a zone of high velocity cooling fluid which flows closely adjacent said relatively thin supporting wall, and a lubricating system for the journal bearing including, a sump for lubricant closely adjacent the cooling fluid flow chamber, a lubricant slinging ring disposed to be rotated by said rotatable member and to pass through the lubricant in said lubricant sump at a point adjacent the cooling fluid flow chamber so as to deliver lubricant to said journal bearing below a predetermined maximum temperature, and return means for lubricant delivered to said bearing is disposed in said bearing housing so as to cool hot lubricant returning to the area of the sump closely adjacent said cooling fluid flow chamber, and means is connected to said bearing housing for delivering and returning cooling fluid from the improved cooling fluid flow chamber.

Accordingly, it is an object of the present invention to provide in a cooling and lubrication arrangement for a bearing supporting a rotatable member, a bearing housing having a connecting means which minimizes heat flow to the bearing from the associated device or apparatus such as a turbine to which the bearing is connected.

It is another object of the present invention to provide a bearing housing for the bearing having an improved cooling fluid flow chamber adapted to provide a high heat transfer rate from the bearing and its supporting bearing housing to the cooling fluid passing through the improved cooling fluid flow chamber in the bearing housing.

It is another object of the present invention to provide an improved cooling fluid flow chamber in the bearing housing for a bearing supporting a rotatable shaft which defines in said cooling fluid flow chamber internal geometry providing a zone of high velocity cooling fluid located in relatively close proximity to the bearing.

It is another object of the present invention to provide a cooling fluid flow chamber in a bearing housing for a bearing wherein the connection for delivering cooling fluid to the cooling fluid flow chamber and for returning cooling fluid from the cooling fluid flow chamber are symetrical with respect to the vertical center line of the bearing housing for the bearing.

It is another object of the present invention to provide a bearing housing for a journal bearing supporting a rotatable member having a lubrication and cooling arrangement adapted to provide a high heat transfer rate for conducting heat from the bearing and its bearing housing and from the lubricant for the bearing to the cooling fluid in an improved cooling fluid flow chamber operatively associated with the lubricating means for the journal bearing.

It is another object of the present invention to provide a bearing housing for the bearing supporting a rotatable member having a self contained lubricating system for the bearing, and an improved cooling fluid flow chamber therein adjacent the self contained lubricating system which shields the self contained lubricating system against heat flow from the associated device to which the bearing housing is connected.

It is another object of the present invention to provide a bearing housing having an improved fluid cooling chamber adaptable for use with an open type cooling fluid circulating system.

It is another object of the present invention to provide a fluid cooling system for the bearing supporting a rotatable member where the bearing housing has an improved fluid cooling chamber adaptable for use with a closed type cooling fluid circulating system having an auxiliary circulating means for circulating cooling fluid to the fluid cooling chamber when the rotatable member is not in operation.

Other objects and advantages of the invention will be apparent from the following description taken in connection with the accompanying drawings in which;

FIG. 1 is a side elevational view of a turbine used for driving a pump and having an improved cooling and lubrication system for bearings in accordance with the present invention associated with a closed type cooling fluid circulating system.

FIG. 2 is a top view of the turbine and pump shown in FIG. 1.

FIG. 3 is a right end view of the turbine and pump shown in FIG. 1 showing the reservoir for cooling fluid and the main and auxiliary radiator type heat exchangers.

FIG. 5 is an inboard end view of the bearing housing taken at line 5—5 of FIG. 1.

FIG. 6 is a vertical section taken through line 6—6 of FIG. 4.

FIG. 7 is a graph showing how the quantity of oil delivered by an oil slinger ring varies with changes in temperature.

FIG. 8 is a graph showing the quantity of oil transferred to the bearing with changes in the speed of rotation of the shaft journalled in the bearing and rotating the oil slinger ring.

Figure 4:
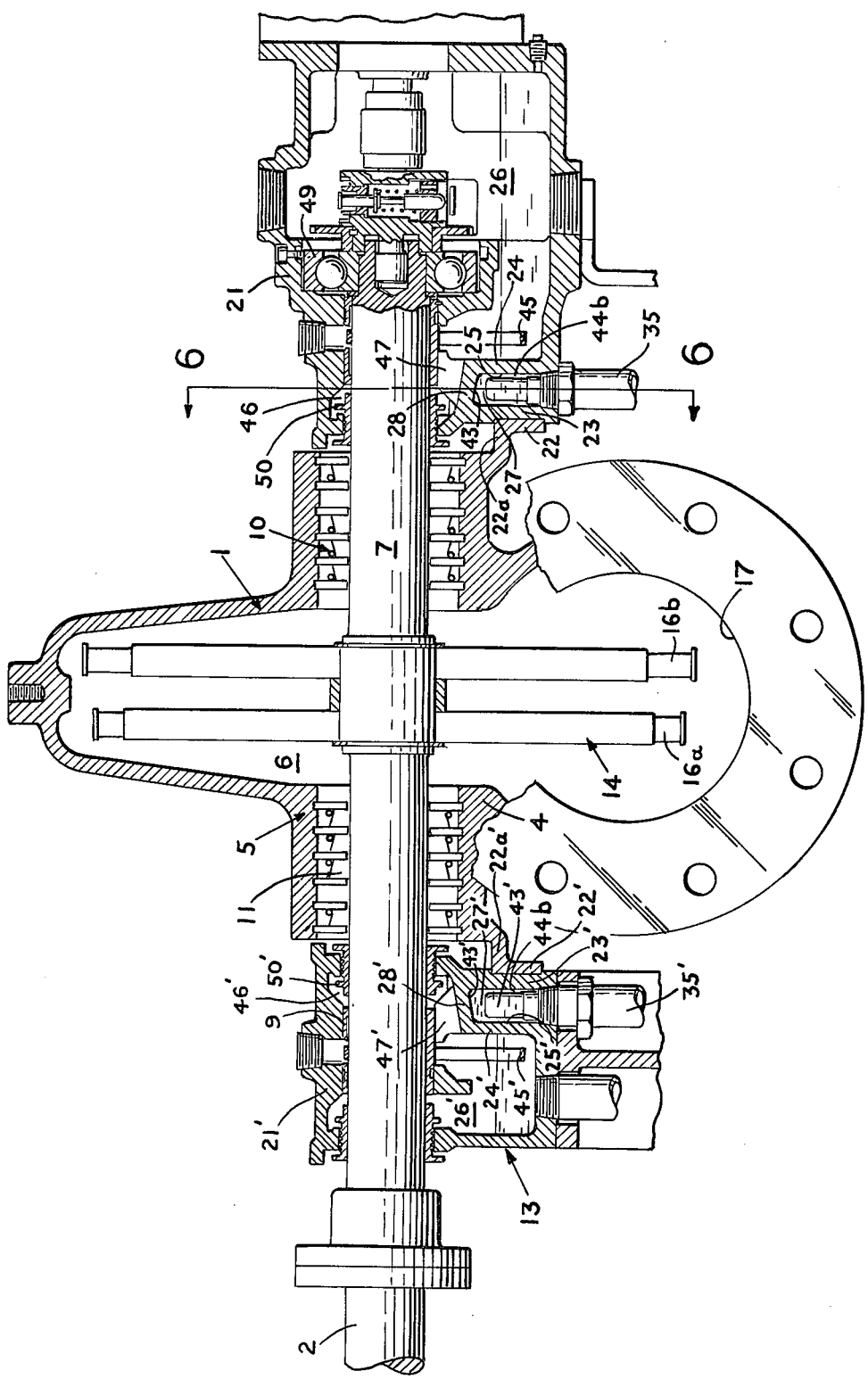
FIG. 4 is a vertical section partly in side elevation taken on line 4—4 of the turbine shown in FIG. 2 of the drawings with the cooling and lubrication system for bearings in accordance with the present invention.

Referring to the drawings FIG. 1 shows one form of the invention as applied to a single-stage turbine generally designated 1 which is connected through a coupling 2 so as to drive a pump 3.

Single-stage turbine 1 is horizontally split to provide a lower casing 4 and an upper casing 5 which define a rotor chamber or space 6 through which a main or driving shaft 7 extends from one end of the turbine to the other, the shaft 7 being rotatably mounted on spaced journal bearings as at 8 and 9 on opposite sides of the rotor chamber or space 6 outboard of carbon seals as at 10 and 11 respectively also on opposite sides of the rotor space 6.

The journal bearings 8 and 9 are each mounted in associated bearing housings generally designated 12 and 13 which are connected to opposite sides of the lower casing 4 by suitable means hereinafter described all of which is shown in FIGS. 1, 2 and 4 of the drawings.

Rotor means as at 14 disposed in the rotor space 6 is fixedly connected to the main or driving shaft 7 so that when the rotor 14 is caused to rotate it will drive the main or driving shaft 7.

Steam delivered through steam inlet, not shown, is directed against the blade 16a and 16b of the rotor 14 to rotate the same and the steam is exhausted through the steam exhaust outlet 17.

The operation and control of the flow of steam in single-stage turbines of the type shown herein is known and understood by those skilled in the art and therefore is not more fully described.

It will be obvious that when the steam causes the rotor 14 to rotate and drive shaft 7 that the shaft in turn through the coupling 2 will drive the pump 3.

LUBRICATION AND COOLING SYSTEM FOR BEARINGS

The present invention is particularly directed to the structure and system for lubricating and cooling the journal bearings 8 and 9 which support the driving shaft 7.

It will be understood that while the present invention is described in the disclosed embodiment as applied to the journal bearings for a single-stage turbine that this is merely for the purposes of illustrations and that the invention is equally applicable to any bearing structure which supports a rotating element regardless of the nature of the device, apparatus or equipment wherein the rotating element forms a part.

Further while the bearing housings 12 and 13 differ in shape it will be understood that the elements which define the construction and arrangement of the present invention are substantially identical and in order to make this clear the elements of the respective bearings 12 and 13 which are identical will be given the same character numeral except that the elements in bearing 13 will be primed to distinguish them from the elements in bearing 12.

Accordingly referring to FIGS. 2 and 3 respective bearing housings 12 and 13 are shown as split into a lower bearing housing section 20 and 20; and upper bearing housing sections 21 and 21'.

Between the lower turbine casing 4 and the lower bearing housing sections 20 and 20' semi-circular flange members as at 22 and 22' are provided on opposite sides of the turbine casing for connecting the lower bearing housing sections 20 and 20' in assembled position. These semi-circular flange members 22 and 22' are preferably shaped and formed so as to space the respective lower bearing housings 20 and 20' as far away from the lower turbine casing as design conditions will permit. Further as is clearly shown in FIGS. 1, 4 and 5 each of the semi-circular flange members 22 and 22' are provided with a relatively thin intermediate section as at 22a and 22a' so that the heat conductive flow area will be limited, the construction and arrangement of this flow area being dictated and determined from the conditions above enumerated which control conductive heat flow namely the ratio of A/L where A represents the cross sectional area of the arc shaped intermediate section 22a and 22a' respectively and L represents the respective length of the semi-circular flange members 22 and 22' supporting the lower bearing housing sections 20 and 20' and that part of the casing therebetween which encloses the shaft seals generally designated 10 and 11.

Reference is now had to FIGS. 4 and 6 which show that the respective bearing housing sections 20 and 20' are provided therein with medially disposed partitions as at 24 and 24' which are disposed essentially parallel to and a spaced distance from each of the respective connecting walls 23 and 23' by which the lower bearing housing sections 20 and 20' are connected to the ends of the semi-circular flange members 22 and 22'. Medially disposed partitions 24 and 24' define in the lower bearing housing sections cooling fluid flow chambers as at 25 and 25' adjacent the side of the respective lower bearing housing sections which connect with the flanges 22 and 22' and lubricant sumps 26 and 26' which lie on the side of the partitions 24 and 24' remote from the connecting walls 23 and 23' so that the oil sumps 26 and 26' are shielded from conductive heat flow by the respective cooling fluid flow chambers 25 and 25'.

The cooling fluid flow chambers 25 and 25' are generally semi-circular in shape with a given width as large as the available space for the given size of the bearing housing. The widest portion of the semi-circularly shaped cooling fluid flow chambers 25 and 25' will extend transverse to the axial line of the shaft 7 and will lie adjacent to the top wall 27 and 27' of the respective lower bearing housing sections 20 and 20' to which the upper bearing sections 21 and 21' are respectively connected.

Thus, semi-circular cooling fluid flow chamber 25 is defined by the connecting wall 23 medial partition 24 and top wall 27 and similarly semi-circular cooling fluid flow chamber 25' is defined by the connecting wall 23', medial partition 24' and top wall 27'.

Further the top walls 27 and 27' have generally concave arcuate center sections as at 28 and 28' which receive in lower bearing grooves 28a and 28a' one half as at 8a of the split bearing 8 and one half as at 9a of the split bearing 9. Similarly the upper bearings sections 21 and 21' have upper bearing grooves as at 21a and 21a' which receive the upper half 8b of the split bearing 8 and the upper half 9b of split bearing 9 respectively. The use of a split bearing housing and split bearings for installation convenience is well known to those skilled in the art.

The concave arcuate sections 28 and 28' in the center sections of the top walls 27 and 27' are made as thin as good foundry practice will permit so as to maximize direct conductive cooling of the respective bearing shells 8 and 9.

Referring now to FIGS. 4, 5 and 6 it will be noted that the respective cooling flow chambers 25 and 25' are symmetrical with respect to the vertical plane in the axis of the shaft 7 taken through the respective bearing housings 12 and 13 and that each of the fluid cooling chambers 25 and 25' are provided with spaced cooling fluid conduits as at 30 and 30' and 31 and 31' which conduits are bilaterally disposed with respect to said vertical plane and thus lie on opposite sides of the cooling fluid flow chambers 25 and 25'. This construction permits either cooling fluid conduit to act as an entering or exit connection for maximum simplicity of piping arrangements about the turbine for bringing cooling fluid to the cooling fluid chambers 25 and 25' from either an open system or a closed system for delivering cooling fluid thereto as is more fully described hereinafter.

For this purpose each of the respective spaced conduits are provided with connecting means as at 32 and 32' for the respective cooling fluid conduits 30 and 30' and 33 and 33' for the respective cooling fluid conduits 31 and 31'.

These connections 32, 32', 33 and 33' for the conduits 30, 30', 31 and 31' open on the exterior of the lower section of the respective bearing housings 12 and 13 closely adjacent to the semi-circular cooling fluid flow chambers 25 and 25' so that they are easily accessible for connection to suitable piping as at 34 and 34' and 35 and 35' which form part of the supply system for delivering cooling fluid to the cooling fluid flow chambers 25 and 25' from a given open or closed cooling fluid circulating system operative therewith.

The conduits 30, 30', 31 and 31' extend vertically into the cooling fluid flow chambers 25 and 25' so that the open ends as at 36, 36', 37 and 37' are disposed a predetermined spaced distance 38 and 38' for the open ends 36 and 36' for respective conduits 30 and 30' and 39 and 39' for the open ends 37 and 37' for the respective conduits 31 and 31' from the inner surfaces 27 and 27a of top walls 27 and 27' of the respective bearing housings 12 and 13.

The predetermined clearance between the open ends 36, 36', 37 and 37' and the inner surfaces 27a and 27a' of the top walls will be in the order of ¼ to ½ of the inner diameter size of the openings formed by the open ends 36, 36', 37 and 37' of the of the conduits 30, 30', 31 and 31'.

This construction in each of the cooling fluid flow chambers is operatively associated with bilaterally spaced triangular shaped guides or baffles 40 and 40' and 41 and 41' which lie inwardly of the conduits 30, 30', 31 and 31' on opposite sides of the vertical plane in the axis of the shaft 7, and extend transversely parallel to the axial line of shaft 7 between the respective connecting walls 23 and 23' and the medial partitions 24 and 24' forming or defining the semi-circular cooling fluid flow chambers 25 and 25' in such a manner that the inverted base or widest portion of the triangularly spaced guides 40, 40', 41 and 41' face the inner surface of the arcuate sections 28 and 28' of the top walls 27 and 27' of the lower bearing housings 12 and 13.

Referring further to FIG. 6 there is shown in the vertical plane of the axis of shaft 7 in each of the respective cooling fluid flow chambers 25 and 25' an upwardly extending vertical member 42 whose upper face lies generally the same spaced distance from the inner surface of the respective arcuate sections 28 and 28' as the triangularly shaped guides or baffles 40, 40', 41 and 41'.

The triangulary shaped guides or baffles 40, 40', 41 and 41' and the upwardly extending members 42 and 42' form in the space between these members and the inner surface of the arcuate sections 28 and 28' a flow path generally designated 43 and 43' of relatively low resistance for cooling fluid flowing to or from the open ends 36, 36', 37 and 37' depending upon the direction of flow through the respective cooling fluid flow chambers 25 and 25'.

Cooling fluid can of course also flow between the open ends 36, 36', 37 and 37' through a flow path of much higher resistance as at 44a or 44b through the small clearances between the conduits 30, 30', 31 and 31' and the upwardly extending vertical member 42 and 42' and the adjacent connecting walls 23 and 23' and the medial partition 24 and 24'. However, in accordance with the well recognized rules of parallel flow of fluids the velocity of the cooling fluid flowing in the flow path 43 will be large where the velocity of the cooling fluid flowing in the flow path 44a and 44b will be relatively small generally in the ratio of 4 to 1.

The cooling fluid conduits 30, 30', 31 and 31' will be sized to achieve fairly high flow velocities in the flow path or zones of high velocity cooling fluid flow at 43 and 43' of about 5' per second and this will be referred to again when the operation of the system for delivering cooling fluid to the improved fluid cooling chambers 25 and 25' is described below.

This higher velocity in the flow path 43 will act to minimize the thickness of the stagnant film of cooling fluid adhering to the inner surface of the arcuate sections 28 and 28' and therefore will promote a high heat transfer rate between the cooling fluid and the arcuate sections 28 and 28' in accordance with the conditions pertaining to forced convection in heat transfer as above described.

In the preferred form of the invention illustrated the respective walls of the upper sections 21 and 21' of the bearing housings 12 and 13 will be relatively thicker and heavier than the walls of the lower section 20 as is shown in FIG. 6 of the drawings. This construction is necessary to promote isothermal conditions for the upper and lower half of the bearing shells 8 and 9. This thickened wall provides a large area for rapid conductive heat transfer from the upper sections 21 and 21' to the cooling fluid flowing in the cooling fluid flow chambers 25 and 25' respectively in the lower sections 20 and 20' of the bearing housings 12 and 13. Such rapid conductive heat flow rate being predictable from the rules appertaining to heat transfer by conduction set forth above.

The effect of this construction is that the cooling fluid flowing in more particularly the high velocity zones 43 and 43' in the respective cooling fluid flow chambers 25 and 25' achieve a high heat removal rate from both the lower sections 20 and 20' and the upper sections 21 and 21' so that the temperature of the oil film separating the respective bearing shells 8 and 9 from the shaft 7 becomes largely a function of the cooling fluid temperature and flow rate.

Since the cooling fluid temperature and flow rate are independent of shaft speed, the avoidance of excessive temperature at the respective bearing shells 8 and 9 is no longer dependent upon the supply of cooled oil from the lubrication sump 26 which is true of the prior art bearing housings having self contained lubrication systems.

Referring to the self contained lubrication system in accordance with the present disclosure, the lubricant sumps 26 and 26' form part of such self contained lubricating system which achieves both lubrication and removal of heat so as to aid and abet maintaining of the bearing shells 8 and 9 below the predetermined maximum limiting temperature of 250° F.

The lubricant sumps 26 and 26' in the illustrated form of the present invention are part of lubricating means for achieving both lubrication and heat removal so as to aid in maintaining the bearing below the predetermined maximum limiting temperature of 250° F.

FIG. 2 shows that the respective lubricant sumps 26 and 26' contain a lubricant generally oil which is maintained at the required level to permit at least one lubricant or oil slinger ring as at 45 and 45' disposed about the shaft 7 to be sized so that it is in continuous communication at its lower end with the lubricant in the lubricant sump 26 and 26'.

When the driving shaft 7 is rotated it will rotate the lubricant slinger rings 45 and 45' so as to cause these rings to deliver lubricant to the associated bearings 8 and 9 mounted in the bearing housings 12 and 13.

The slinger rings 45 and 45' are disposed to communicates with the sections of the respective lubricant sumps 26 and 26' which are in close proximity to the fluid cooling chambers. This is important because the oil pumping rate and the rate of oil supplied to the bearings by the slinger rings 45 and 45' is strongly influenced by the viscosity of the lubricant in the sump. Since viscosity in turn is affected by the temperature at which the lubricant is maintained, that is; the lower the temperature the higher the viscosity and vice versa; it is desirable to maintain the lubricant at the lowest possible operating temperature.

This is shown graphically in FIGS. 7 and 8 of the drawings indicating oil ring delivery as influenced by temperature. It will be clear from these graphs that the lower the temperature the higher the quantity of oil delivered to the journal bearing, more particularly as the speed of operation increases.

When the lubricant is delivered to the respective journal bearings 8 and 9 it will pass axially along shaft 7 both in the inboard direction and the outboard direction. When it passes in the outboard direction it will flow to the side of the lubricant sump remote from the partitions 24 and 24' which divide and the lower bearing housing sections 20 and 21 into the cooling fluid flow chambers 25 and 25' and lubricant sumps or reservoirs 26 and 26'. Lubricant moving towards the outboard end of the bearings 8 and 9 will act to cool the bearings and therefore will be relatively hot when it is delivered into the lubricant sumps or chambers 26 and 26'. However, as it migrates back towards the lubricant slinging rings 45 and 45' the residence time in the lubricant sumps 26 and 26' allows for heat removal before it is again delivered by the lubricant slinging rings 45 and 45' to the respective bearings 8 and 9.

When the lubricant delivered to the bearings 8 and 9 flows in the inboard direction it passes to collecting chambers as at 46 and 46'. Chambers 46 and 6' in turn communicate at their lower sections with return passages 47 and 47' formed in the respective support walls 28 and 28'. As is shown in FIGS. 4 and 6 the return passages 47 and 47' lie in the vertical plane below the axial line of the shaft 7 so that one end thereof respectively communicates with the associated collecting chamber 46 or 46' and the other end with the lubricant sump 26 and 26'.

Therefore, lubricant which passes along the bearings 8 and 9 in the inboard direction to the respective collecting chambers 46 and 46' flows by gravity through the return passages 47 and 47' back to the lubricant sump 26 and 26'. However, because the return passages 47 and 47' are in close proximity to the respective zones of high velocity cooling fluid flow as at 27 and 27' in the cooling fuid flow chambers 25 and 25' even though relatively hot it will be cooled during the flow through the return passage 47 and 47' so that it can be delivered to the side of the lubricant sumps 26' closely adjacent to the cooling fluid flow chambers 25 and 25' without changing the temperature conditions of the lubricant being contacted by the oil slinging ring 45. In fact, it will be cooled so rapidly in its flow through the return passages 47 and 47' by reason of its proximity to the fluid cooling chambers 25 and 25' that it produces minimum oil temperatures in the area of the lubricant sump through which the oil slinging ring passes which therefore produces maximum oil pumping rates as indicated by the graph at FIG. 7 as explained above.

In bearing housing 12 the oil moving in the outboard direction will additionally pass through the ball thrust bearing 49 to lubricate the same and therefore will be returned to the sump in relatively warmer condition then oil passing outboard on bearing 8. However, because of the size of the lubricant sump 26 for the bearing housing 12 the residence time for heat removal befor it circulates back to the vicinity of the oil slinging ring 45 will be sufficiently great for adequate heat removal so as not to affect the oil pumping rates of the oil slinging ring 45' nor the delivery rate of oil to the bearing 8 mounted in the bearing housing 12.

Connected to the shaft 7 and rotatable therewith are slinger shaft seals 50 and 50' which are disposed in the collecting chambers 46 on the inboard side of the respective bearings 8 and 9. The slinger shaft seals 50 and 50' act to seal against the lubricant flow along the shaft in the inboard direction. Further the pumping action of the slinger shaft seals is added to the force exerted to the force exerted by gravity on the lubricant collected in the collecting chambers 46 and 46' and returning through the return passages 47 and 47' for the respective bearing housings 12 and 13.

In operation, when steam is admitted to rotate the rotor 14 it will cause shaft 7 fixedly connected thereto to rotate in the bearings 8 and 9 driving the oil slinging rings 45 and 45' as a function of the speed of rotation of the shaft 7.

The oil slinger rings 45 and 45' will deliver lubricant from the lubricant sumps 26 and 26' to the top side of the bearings 8 and 9 and lubricant will pass along the shaft in the inboard and outboard direction and return to the lubricant sumps 26 and 26' as above described. The lubricant returning from the inboard side will be cooled rapidly and returned to the lubricant sump 26 at a point closely adjacent to the cooling fluid flow chamber 25 and conversely the lubricant passing in the outboard direction being returned to the lubricant sump at a point remote from the fluid cooling chamber 25 so that as it migrates slowly back to the oil slinging ring position in the lubricant sump, it will be cooled so that it will not seriously affect the viscosity of the oil being pumped by the oil slinger ring 45.

Many prior art cooling water chambers in bearing housings for journal bearings of existing turbines have performed well for turbine speeds to 5000 R.P.M. where normal steam inlet temperatures does not exceed 750° F and maximum cooling water temperatures are limited to 90° F.

Oil exit temperatures from such bearings are desirably maintained at 160° F but a maximum limit of 180° F has been considered acceptable.

The problem however with such prior art cooling fluid flow chamber designs is that they frequently cause the bearings to fail from overheating after the turbine is shut down or if the turbine is operated on a condition called "hot stand-by". The hot stand-by condition occurs when the turbine shaft is stationary and the turbine casing exposed to exhaust pressure and temperature from its connection to a common exhaust line into which other adjacent operating turbines are delivering hot exhaust steam.

To avoid bearing failures due to overheating at hot stand-by conditions the usual practice is to install a large check or non-return valve between the exhaust pipe connection of each turbine and the common exhaust duct. Such valves of course are not only expensive but additionally can develop leaks due to corrosion or other reasons at which time bearing failures due to overheating on stand-by will once again occur.

Further the tolerance of bearings cooled by these prior art cooling fluid flow chambers is marginal for even short periods of deviations from the norms above set forth. Since bearing failure usually relates to high temperatures, it is at once clear that an improved cooling fluid chamber as disclosed in the present invention is highly desirable departure from such prior art devices.

The departure from prior art devices combines the structures above described to minimize conductive heat flow from the hot turbine casings 4 and 5 to the bearing housings 12 and 13 and the bearings 8 and 9 to optimize heat transfer from the bearings to the cooling fluid passing through the respective cooling fluid flow chamber 25 and 25', and to maximize cooling of the lubricant used by the self contained lubricating system for the bearing.

However, in order to have any cooling fluid flow chamber operate properly it is necessary to connect the cooling fluid chamber to some form of cooling fluid circulating system and such systems will now be described.

COOLING FLUID CIRCULATING SYSTEMS

Cooling fluid circulating systems for delivering cooling fluid to the improved cooling fluid chamber in accordance with the present invention may be the conventional open type cooling fluid circulating system which are well known to those skilled in the art.

Such systems utilize cooling water which is pumped from a constant heat sink such as a river, lake or artificial pond to the cooling fluid chambers and then the heated cooling water is returned to the heat sink at a point remote from the point where the pump intake is located to give the heated cooling water an opportunity to be cooled back to the heat sink temperature before migrating back to the area where the circulating pump takes its suction.

These systems are in such common use as to require no further description.

The alternative to the open systems are closed systems. In a closed system a closed circulating cooling loop connects in series by suitable piping or conduit means, a cooling fluid reservoir, a circulating pump, the cooling fluid flow chambers, and a heat exchanger at which heat collected by the circulated cooling fluid is transferred to a heat sink medium such as atmospheric air; river water, lake water, etc.

For many applications the use of a closed type cooling fluid circulating system utilizing air as the final heat sink offers many advantages.

First, ecological restrictions due to local ordinances, state or federal statutes can be avoided. Second, increased costs of installation and maintanence complication where the cooling system must be protected from freezing temperatures as would be required with open systems can also be avoided. And third, operating restrictions when droughts occur can also be avoided.

In a closed system a non-freezing mixture of water and ethylene glycol or some other suitable cooling fluid medium is constantly circulated and recirculated between the improved cooling fluid flow chambers 25 and 25' and a suitable type of heat exchanger where the heated cooling fluid is cooled before it is returned to the reservoir for the cooling fluid.

However, the heat transfer requirements for a cooling fluid flow chamber for maintaining the journal bearings below the predetermined critical temperature of 250° F at all conditions of operation including, hot stand-by and after shut down following operation of the turbine, are much more demanding where a closed type cooling fluid circulating system utilizes air as the cooling medium in the heat exchanger then in an open system utilizing water as the cooling medium in the heat exchanger.

This is best illustrated by comparing the operating conditions which occur at maximum bearing and cooling water temperatures in an open system and a closed system as is shown in the following table:

|   |   | Open Circ. Systems | Closed Circ. Systems |
|---|---|---|---|
| 1. | Max. permissible Bearing Supply Oil Temp. | 160° F | 160° F |
| 2. | Max. Bearing Exit Oil Temp. (minimum acceptable use) API *611) | 180° F | 180° F |
| 3. | Max. Ambient Air Temp. | — | 100° F |
| 4. | Max. Acceptable Cooling Water Temp. | 90° F | 125° F |
| 5. | Temp. Diff. Oil Supply Temp. to Cooling Water Temp. | 70° F | 35° F |
| 6. | Temp. Diff. Oil Exit Temp. to Cooling Water Temp. | 90° F | 55° F |

*American Petroleum Institute

From Line 5 and 6 of Table A it can be seen that the ratio of available temperature differences for heat removal is about 2 to 1 in favor of open systems.

Therefore to maintain the bearings being cooled below the desired maximum operating temperatures of 180° F, the heat transfer rate for a cooling fluid chamber utilizing a closed cooling circulating system having air as the cooling medium must be about double the heat transfer rate for a corresponding cooling fluid flow chamber when used with an open circulating system utilizing water as the cooling medium.

This illustrated comparison explains why prior art cooling fluid chambers have never been successfully applied with closed cooling systems except in isolated instances where both inlet steam temperatures and operating speeds of the turbines were unusually low.

By reason of the difference in the structure and the difference in the operation of the improved cooling fluid flow chamber in accordance with the present invention, such improved cooling fluid flow chamber can be applied satisfactorily to either open or closed cooling fluid circulating systems for steam inlet temperatures to 750° F and speeds to at least 5000 R.P.M.

Figure 9:
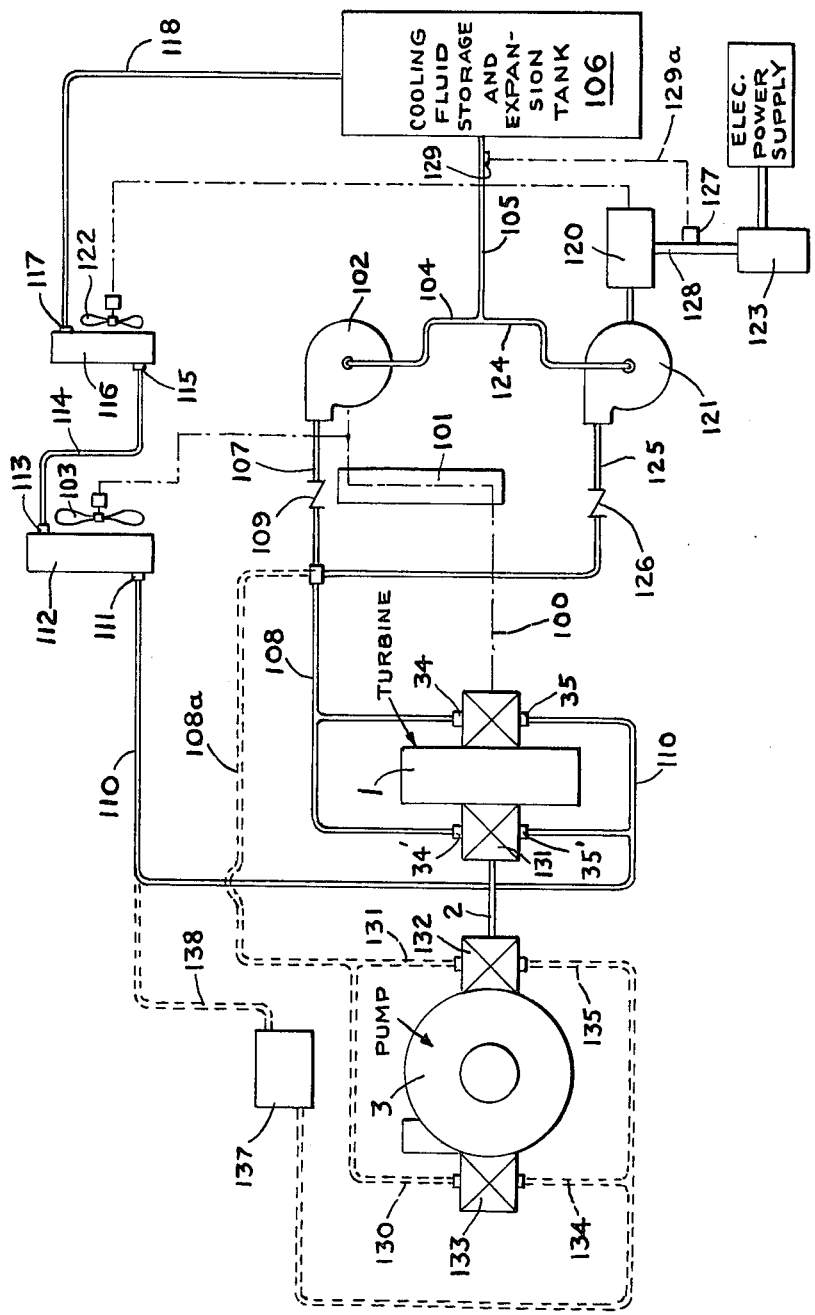
FIG. 9 is a schematic piping diagram for the closed type circulating system for delivering cooling fluid from the reservoir to the bearing housing and returning the cooling fluid from the bearing housing through the radiator type heat exchangers to the reservoir.

FIGS. 1, 2 and 3 shows the general physical arrangement and FIG. 9 showing the schematic flow circuit fluid circulating system particularly adaptable for use with the improved cooling fluid flow chamber in accordance with this invention.

Thus FIGS. 1 and 2 show a jack shaft 100 connected at one end to and driven by the drive shaft 7 of the turbine. Jack shaft 100 is connected at the opposite end through suitable reduction gearing 101 to a main circulating pump 102 and a main fan 103 so that when shaft 7 is rotating it will drive the main circulating pump 102 and main fan 103.

Circulating pump 102 has its suction line 103 connected by line 104 to a main common inlet line 105 which is connected to a coolant storage and expansion tank 106 so that when the main circulating pump 102 is in operation it will have a continuous source of coolant fluid to deliver to the circulating system.

The discharge line 107 for the pump 102 is connected to the common delivery line 108 in turn connected to one or the other of the respective cooling fluid conduits for example cooling fluid conduits 34 and 34' for delivering cooling fluid to the respective cooling fluid chambers 25 and 25' in their associated bearing housings 12 and 13.

A normally closed check valve as at 109 is provided in the delivery line 107 to maintain unidirectional flow of cooling fluid in the circulating system and to prevent any backflow to the circulating pump 102.

After the cooling fluid passes through the respective fluid cooling chambers 25 and 25' it is returned through the fluid cooling conduits 35 and 35' to a common return line 110 which connects at the end remote from these lines to the inlet 111 of the main heat exchanger 112. The outlet 113 of the main heat exchanger 112 communicates by a connecting line 114 with the inlet 115 of an auxiliary heat exchanger 116 and from the outlet 117 of the auxiliary heat exchanger cooling fluid is returned through a connecting conduit 118 which is connected and returns the cooling fluid to the coolant storage and expansion tank 106.

The respective main heat exchanger 112 and auxiliary heat exchanger 116 are of the fan and radiator type as shown in FIGS. 1, 2, 3 and 9 of the drawings and because such heat exchangers are easily purchaseable on the open market and are well known to those skilled in the art it is not deemed necessary to describe them more fully.

The main fan 103 will be operatively associated with the main heat exchanger 112 and will continuously drive ambient air across the heat exchanger 112 as long as the turbine is in operation. This air will act to cool the heated cooling fluid as it passes through the heat exchanger 112.

The auxiliary heat exchanger 116 will operate only minimally when the turbine is in normal operation because its associated fan as is hereinafter more fully described will not be in operation. However, when the turbine is shut down or is placed on hot standby the main heat exchanger will no longer be operating efficiently because the fan 103 will no longer be in operation. At that time the auxiliary heat exchanger will be activated by a thermal relay responsive to cooling fluid supply temperature in line 105 as is more fully described below.

Thus when the turbine is started up and placed into normal operation it continuously drives the pump 102 and fan 103 and as long as this operation continues cooling fluid will be circulated from the coolant storage and expansion tank 106 to the respective fluid cooling chambers 25 and 25' and will be returned from the respected fluid cooling chambers 25 and 25' through the main heat exchanger 112 and auxiliary heat exchanger 116 to the cooling fluid storage and expansion tank 106 as has been above described.

When the turbine is shut down or is placed on hot standby the auxiliary system to aid in preventing the bearings 8 and 9 from overheating will come into operation.

This auxiliary circulating system includes a suitable electric motor 120 for driving an auxiliary pump 121 and fan 122 from any suitable type of electrical source which may be a battery 123 maintained at suitable charge through an associated electrical system.

The fan 122 will be operatively associated with the auxiliary heat exchanger 116 so as to drive ambient air thereacross so long as the fan 122 is driven.

The auxiliary pump 121 has its suction line 124 connected to the common inlet line 105 so as to provide a continuous source of cooling fluid thereto in the same manner as has been provided for the main circulating pump 102. The discharge line 125 connects to the common delivery line 108 and also has a normally closed check check valve 126 therein to maintain unidirectional flow in the circulating system and to prevent any backflow to the auxiliary pump 121 when the main pump is in operation.

The auxiliary circulating system is actuated by any suitable type of normally open thermal relay 127 which is interposed in the electric supply lines 128 between the bolting 123 and electric motor 120. The thermal relay 127 is actuated to closed position by signals from the sensor 129 connected to the common inlet line 105 which supplies cooling fluid to the suction inlets of the respective pumps 102 and 121. When the temperatures of the cooling fluid exceeds a predetermined setting the sensor 129 will signal the thermal relay 127 to closed position through the sensing line 129a.

Cooling fluid delivered by the auxiliary pump 120 to the common delivery line 108 will follow the same flow path to the respective fluid cooling chambers 25 and 25' and the same return path from the fluid cooling chambers 25 and 25' to the coolant storage and expansion tank 105 as has been above described for the main circulating pump.

However since the fan 103 is no longer in operation because the turbine is shut down, the main heat exchanger 112 will now be operating at minimal efficiency for removing heat from the cooling fluid passing therethrough. Conversely however because the fan 122 will be operating, the auxiliary heat exchanger 115 now will act to cool cooling fluid circulating in this system so that the cooling fluid returned to the coolant storage and expansion tank will have the heat removed therefrom as was done by the main heat exchanger during normal operation of the turbine. However, the auxiliary heat exchanger can be smaller in size than the main heat exchanger because the auxiliary heat exchanger will be merely overcoming the effect of heat soak and other sources of heat that may occur on shut down or on standby conditions of the turbine. At this time shaft 7 is not rotating and therefore heat from viscous shear of oil in the bearing will not be generated.

DELIVERING COOLING FLUID TO COMPONENTS OPERATIVELY ASSOCIATED WITH THE TURBINE

FIG. 9 further shows by the dotted circuit lines that the closed type cooling fluid circulating system can be expanded to provide cooling fluid for cooling bearings and/or seals for example of the circulating pump 3 driven by the turbine.

Thus the inlet lines 130 and 131 for the bearings 132 and 133 of the pump 3 will be connected by line 108a to the common delivery duct 108 so as to pass cooling fluid from the common delivery duct 108 to the bearings 132 and 133 whenever the main circulating pump 102 or auxiliary circulating pump 121 are in operation. The outlet lines 134 and 135 will connect to the inlet 136 of an intermediate heat exchanger 137 whose outlet line 138 communicates with the common return line 110 for the main circulating system.

The purpose of the intermediate heat exchanger 137 is to provide a means of cooling separate filtered supplies of fluid (not shown) from the discharge of pump 3 to the shaft mechanical seals generally inboard of the bearings 132 and 133 as is known and understood by those skilled in the art.

Fluid will be continuously circulated through the bearings and heat exchanger from the common delivery line 108 to the common return line 110 at all times when the main circulating pump 102 or auxiliary circulating pump 121 is in operation.

While radiator air cooled heat exchanger means have been illustrated for the closed type circulating system for cooling fluid herein illustrated, it will be obvious to those skilled in the art that other forms of main and auxiliary air cooled heat exchangers can be used in place of the main heat exchanger 112 and auxiliary heat exchanger 116 without departing from the scope of the type of closed circulating system that will work efficiently and effectively with the improved cooling and lubrication system for bearings having self contained lubrication systems in accordance with the present invention.

Thus, there has been described an improved bearing housing wherein heat flow from the turbine to the bearing through the bearing housing has been minimized, an improved cooling fluid flow chamber whose internal geometry provides a flow zone of relatively high velocity coolant fluid closely adjacent the bearing acts to maximize heat transfer from the bearing to the cooling fluid so that the temperature difference between the bearing and the cooling fluid is greatly reduced, and structure is also provided to cool the heated lubricant returning to the sump of the self contained lubrication system for the bearing.

In this construction the bearing temperature is no longer largely dependent upon oil delivered by the oil slinger ring of the self contained lubricating system which diminishes rapidly at high speeds.

Therefore, the improved cooling and lubrication system in accordance with the present invention can be utilized with a closed type cooling water circulating system and still will be able to maintain the bearing temperatures below the limiting temperature either when the shaft is rotating or when it is stationery.

It will be understood that the invention is not to be limited to the specific construction or arrangement of parts shown but that they may be widely modified within the scope of the invention defined by the claims.

What is claimed is:

1. In a cooling and lubrication arrangement for a bearing supporting a rotatable member,
   a. bearing housing means for supporting said bearing having a lower section, and an upper section,
   b. connecting means for said bearing housing means to minimize conductive heat flow to said bearing,
   c. a partition in said lower section of the bearing housing means defining therein on opposite sides of the partition, means forming a sump for a self contained lubrication system for the bearing, and means forming a cooling fluid flow chamber;
   d. means connected to said bearing housing means and in communication with said cooling fluid flow chamber means to provide an inlet for cooling fluid and an outlet for cooling fluid,
   e. means providing an internal geometry for said cooling fluid flow chamber including, baffle means between said inlet and said outlet to provide a zone of relatively high velocity cooling fluid in the cooling fluid flow chamber at the portion thereof closely adjacent to the bearing, and
   f. means connected to said inlet and outlet for circulating cooling fluid to and returning the same from said cooling fluid flow chamber.

2. In a cooling and lubrication arrangement for a bearing as claimed in claim 1 wherein, the connecting means has a limited section area, and a length as long as the available space for the given application will permit.

3. In a cooling and lubrication arrangement for a bearing as claimed in claim 1 wherein,
   a. the internal geomery of the cooling fluid chamber means includes, a support wall on the lower section adjacent to the bearing,
   b. said support wall being relatively thin, and
   c. said inlet and said outlet having openings in said cooling fluid flow chamber means closely adjacent the side of the supporting wall remote from the bearing.

4. In a cooling and lubrication arrangement for a bearing as claimed in claim 3 wherein,
   a. said upper section of the bearing housing means is connected directly to the relatively thin supporting wall on the lower section, and
   b. said upper section has a relatively thick wall area to provide rapid conductive heat transfer from the bearing to the cooling fluid in the zone of high velocity in the cooling fluid flow chamber.

5. In a cooling and lubrication arrangement for a bearing as claimed in claim 3 wherein the baffle means in the cooling fluid chamber means is a predetermined spaced distance from the side of the supporting wall remote from the bearing.

6. In a cooling and lubrication arrangement for a bearing as claimed in claim 1 wherein, a. means are provided for delivering lubricant from the portion of the sump closely adjacent to the partition; and b. lubricant return means in said bearing housing for returning lubricant to said sump disposed relative to cooling fluid flow chamber so as to cool lubricant being returned therethrough.

7. In a cooling and lubrication arrangement for a bearing as claimed in claim 3 including, a. means forming a self contained lubrication system for delivering lubricant to said bearing including, at least one slinger ring means to be rotated with rotation of the shaft mounted in said bearing, b. said slinger ring means disposed for rotation through the portion of said lubricant sump closely adjacent the partition, and c. lubricant return means for returning lubricant from said bearing to said bearing housing means including, a passage means in the supporting wall adjacent to the zone of relatively high velocity cooling fluid flow in said cooling fluid flow chamber.

8. In a cooling and lubrication arrangement as claimed in claim 1 wherein the means for circulating cooling fluid is a closed circulation system.

9. In a cooling and lubrication arrangement as claimed in claim 8 wherein the closed circulation system includes, a. a main pump circulating system, b. an auxiliary pump circulating system, and c. means for actuating the operation of said auxiliary pump circulating system when said main circulating system is not in operation responsive to a predetermined increase in temperature in the cooling fluid in said closed circulating system.

10. In a cooling and lubrication arrangement for a bearing supporting a rotatable member, a. bearing housing means for supporting said bearing having, an upper section, and a lower section, b. connecting means for said bearing means having as long a length as available space will permit and having a medial section with limited cross sectional area to minimize conductive heat flow to said bearing, c. said bearing housing means having a wall connected to the connecting means, d. partition means in said lower section of the bearing housing means defining therein on opposite sides of said partition means, a cooling fluid flow chamber on the side adjacent said connecting wall, and a sump for a self contained lubrication system for the bearing on the side of the partition means remote from the connecting wall, e. said cooling fluid flow chamber having a semi-circular shape and defined on opposite sides by the connecting wall and the partition means, and having a relatively thin supporting wall adjacent the bearing, f. conduit means connected to said bearing housing means and in communication with said cooling fluid flow chamber to provide an inlet for cooling fluid and an outlet for cooling fluid for said flow chamber, g. said conduit means bi-laterally disposed with respect to the centerline of said cooling fluid flow chamber, h. baffle means connected to said bearing housing means and disposed in said cooling fluid flow chamber between the conduit means and a predetermined spaced distance from the thin supporting wall to provide a zone of relatively high velocity cooling fluid flow in the cooling fluid flow chamber closely adjacent the said thin supporting wall, and i. means connected to said conduit inlet and outlet means for circulating cooling fluid to and returning the same from said cooling fluid flow chamber.

11. In a cooling and lubrication arrangement for a bearing as claimed in claim 10 wherein, a. said conduit means having an open end in said cooling fluid flow chamber disposed a predetermined distance from the inner surface of the thin supporting wall, and b. said conduit means sized to deliver approximately 15 GPM of cooling fluid to the cooling fluid flow chamber and to return the same therefrom.

12. In a cooling and lubrication arrangement for a bearing as claimed in claim 11 wherein the predetermined spaced distance that the open ends of the conduit means is spaced from the inner surface of the thin supporting wall is between ¼ to ½ the diameter of the open ends of the conduit means.

13. In a cooling and lubrication arrangement for a bearing as claimed in claim 10 wherein, a. said upper section of the bearing housing means is connected directly to the thin supporting wall in the lower section, and, b. said upper section has a relatively thick wall area to provide rapid conductive heat transfer from the bearing to the cooling fluid in the zone of high velocity in the cooling fluid flow chamber.

14. In a cooling and lubrication arrangement for a bearing as claimed in claim 10 wherein, a. means are provided for delivering lubricant from the portion of the sump closely adjacent to the partition means; and b. lubricant return means in said bearing housing means for returning lubricant to said sump disposed relative the cooling fluid flow chamber so as to cool lubricant being returned therethrough.

15. In a cooling and lubrication arrangement for a bearing as claimed in claim 10 including, a. means forming a self contained lubrication system for delivering lubricant to said bearing including, at least one slinger ring means to be rotated with rotation of the shaft mounted in said bearing, b. said slinger ring means disposed for rotation through the portion of said lubricant sump closely adjacent the partition means, and c. lubricant return means for returning lubricant from said bearing to said bearing housing means including, a passage means in the supporting wall adjacent to zone of relatively high velocity cooling fluid flow in said cooling fluid flow chamber.

16. In combination with a turbine having turbine casing, and a bearing for supporting the turbine shaft, a cooling and lubrication arrangement for the bearing including, a. a bearing housing means for supporting said bearing having, a lower section, and an upper section, b. connecting means for connecting said bearing housing to said turbine casing to minimize heat flow to said bearing, c. a partition in said lower section of the bearing housing means defining therein on opposite sides of the partition, means forming a sump for a self contained lubrication system for the bearing, and means forming a cooling fluid flow chamber;

d. means connected to said bearing housing means and in communication with said cooling fluid flow chamber means to provide an inlet for cooling fluid and an outlet for cooling fluid, e. means providing an internal geometry for said cooling fluid flow chamber including, baffle means between said inlet and said outlet to provide a zone of relatively high velocity cooling fluid in the cooling fluid flow chamber at the portion thereof closely adjacent to the bearing, and f. means connected to said inlet and outlet for circulating cooling fluid to and returning the same from said cooling fluid flow chamber.

17. In the combination as claimed in claim 16 wherein the connecting means includes,
    a. an intermediate section having a limited cross-sectional area, and
    b. said connecting means having a length as long as the available space between the turbine casing and the bearing housing will permit.

18. In the combination as claimed in claim 16 wherein,
    a. the internal geometry of the cooling fluid chamber means includes, a support wall on the lower section adjacent to the bearing,
    b. said support wall being relatively thin, and
    c. said inlet and said outlet having openings in said cooling fluid flow chamber means closely adjacent the side of the supporting wall remote from the bearing.

19. In the combination as claimed in claim 18 wherein the baffle means in the cooling fluid chamber means is a predetermined spaced distance from the side of the supporting wall remote from the bearing.

20. In the combination as claimed in claim 16 wherein,
    a. means are provided for delivering lubricant from the portion of the sump closely adjacent to the partition means; and
    b. lubricant return means in said bearing housing means for returning lubricant to said sump disposed relative the cooling fluid flow chamber so as to cool lubricant being returned therethrough.

21. In the combination as claimed in claim 18 including,
    a. means forming a self contained lubrication system for delivering lubricant to said bearing including at least one slinger ring means to be rotated with rotation of the shaft mounted in said bearing,
    b. said slinger ring means disposed for rotation through the portion of said lubricant sump closely adjacent the partition means, and
    c. lubricant return means for returning lubricant from said bearing to said bearing housing means including, a passage means in the supporting wall adjacent to the zone of relatively high velocity cooling fluid flow in said cooling fluid flow chamber.

22. In the combination as claimed in claim 16 wherein the means for circulating cooling fluid is a closed circulation system.

23. In the combination as claimed in claim 22 wherein the closed circulation system includes,
    a. a main pump circulating system
    b. an auxiliary pump circulating system, and
    c. means for actuating the operation of said auxiliary pump circulating system when said main circulating system is not in operation responsive to a predetermined increase in said closed circulating system.

24. A cooling assembly in the bearing housing for a bearing comprising,
    a. means in said bearing housing forming a cooling fluid chamber,
    b. said means forming the cooling fluid chamber having an upper section shaped for conductive communication with the bearing,
    c. said bearing housing having an inlet connected to a source of cooling fluid and an outlet spaced a predetermined distance from said inlet for returning the cooling fluid to said source,
    d. said inlet and said outlet each respectively having an open end for delivering cooling fluid to said cooling fluid chamber disposed a predetermined spaced distance from the upper section of the means forming the cooling fluid chamber in the bearing housing,
    e. and baffle means in said bearing housing disposed medially in said fluid cooling chamber, and
    f. said outlet for the inlet for cooling fluid and said inlet for the outlet for cooling fluid disposed to coact with said baffle means to form at least one zone of high velocity flow cooling fluid from said inlet to said outlet in the area adjacent to the upper section of the bearing housing forming the fluid cooling chamber.

25. In a cooling assembly in a bearing housing as claimed in claim 24 wherein,
    a. said upper section of the bearing housing having an arcuate connecting section,
    b. said arcuate connecting section disposed substantially in the centerline of the bearing housing, and
    c. said inlet and said outlet for cooling fluid being bilaterally disposed with respect to the centerline of the bearing housing.

* * * * *